United States Patent [19]
Austin

[11] Patent Number: 5,528,319
[45] Date of Patent: Jun. 18, 1996

[54] PRIVACY FILTER FOR A DISPLAY DEVICE

[75] Inventor: R. Russel Austin, Novato, Calif.

[73] Assignee: Photran Corporation, Lakeville, Minn.

[21] Appl. No.: 336,270

[22] Filed: Nov. 8, 1994

Related U.S. Application Data

[63] Continuation-in-part of Ser. No. 135,749, Oct. 13, 1993.
[51] Int. Cl.$^6$ ............................... H04N 5/72; H04N 5/65
[52] U.S. Cl. ........................... 348/835; 348/834; 348/818
[58] Field of Search .................................... 348/834, 835, 348/840, 841, 842, 818; 313/110, 474, 478

[56] References Cited

U.S. PATENT DOCUMENTS

| | | | |
|---|---|---|---|
| 4,764,410 | 8/1988 | Grzywinski | 428/120 |
| 4,766,023 | 8/1988 | Lu | 428/120 |
| 4,812,709 | 3/1989 | Dudasik | 313/478 |
| 5,179,318 | 1/1993 | Maeda et al. | 313/466 |
| 5,254,388 | 10/1993 | Melby et al. | 428/120 |

Primary Examiner—Edward L. Coles, Sr.
Assistant Examiner—Kimberly A. Williams
Attorney, Agent, or Firm—R. Russel Austin

[57] ABSTRACT

A privacy filter (20) for a display device includes at least two spaced-apart, generally parallel grids (22 and 24). Each grid includes an array of strips (26 and 30) or blocking members having transparent space (28 and 32) therebetween. The strips or blocking members are formed aligned such that an image (37) displayed on the display device may be viewed through the filter at an angle of incidence within a predetermined range of angles but is not discernable at angles outside of the predetermined range.

14 Claims, 6 Drawing Sheets

PRIVACY FILTER FOR A DISPLAY DEVICE

CROSS REFERENCE TO OTHER APPLICATIONS

This application is a continuation-in-part of application Ser. No. 08/135,749, filed Oct. 13, 1993.

TECHNICAL FIELD OF THE INVENTION

The present invention relates in general to a filter for a display device. The invention relates in particular to a filter which permits a displayed image to be clearly visible within a predetermined range of viewing angles, while obscuring the image at viewing angles outside of the predetermined range.

BACKGROUND OF THE INVENTION

Display devices such as liquid crystal display devices, light-emitting diode (LED) display devices, video display units (VDUs) and the like are common in many areas of work and everyday life in the industrialized countries of the world. It is not unusual for such devices to display information which is private and confidential, and intended only for the benefit of a user of the display device, or for a limited group of people who must work with the information displayed.

Such a display, for example, may be found in an automated teller machine (ATM) outside of a bank. Such a display may be a VDU in an office displaying, for example, personnel records, medical records, or other confidential information. In many cases, it is not possible or practical to restrict movement of people in the vicinity of the display who have no need to see the displayed information. In such cases, there will always be a possibility that the displayed information may be seen by unauthorized people who may use the information to the disadvantage of a person or persons that the information concerns.

There is a need for a relatively inexpensive filter which will restrict visibility of an image on a display device to a narrow range of viewing angles near normal incidence, while obscuring the image at angles outside of the range. Such a filter would limit the extent to which displayed information could be seen by a casual or unauthorized observer. Preferably, the filter, from a users point of view, should be effective in reducing reflection from the display device thus providing contrast enhancement for the displayed image.

SUMMARY OF THE INVENTION

In one preferred embodiment, a filter in accordance with the present invention comprises at least first and second parallel spaced-apart planar grids. The grids include respectively first and second pluralities of parallel spaced-apart generally flat opaque strips having transparent spaces therebetween. Each of the strips has first and second opposite surfaces generally in the plane of the grid. The first and second pluralities of strips are aligned in the same direction with first surfaces thereof in a face-to-face relationship such that when the filter is placed in front of the display with the first grid closest to the user, and when the filter is viewed by a user of the display at a predetermined angle of incidence, the second grid is not visible to the user, and the display is visible to the user through the transparent spaces in the first and second grids.

Preferably, the predetermined angle of incidence is selected to be about normal incidence in a horizontal plane of incidence.

Preferably, the filter strips of the first and second grids are formed from a metal deposited on first surfaces of respectively first and second transparent substrates. Each of the strips in the second grid preferably includes a reflection reducing coating on the second surface thereof. The first surface of each strip in the second grid is preferably highly reflective for visible light. Each of the strips in the first grid preferably includes a reflection reducing coating on both the first and second surfaces thereof.

For an observer observing a displayed image at non-normal incidence, the second grid becomes increasingly more visible with increasing angle of incidence, and increasingly attenuates the displayed image. Beyond a certain angle of incidence, which is determined by strip width, width of spaces between strips, and spacing between the first and second grids, background light is increasingly reflected toward the observer from the first surfaces of strips in the second grid. Additionally, background light is reflected towards the casual observer from the front surface of the substrate on which the first grid is deposited. In preferred embodiments of the filter in accordance with the present invention, the combination of light reflected from grid strips and light reflected from the substrate begins to obscure the displayed image at angles of incidence beginning at about thirty degrees. The angle of incidence at which effective obscuration begins may be selected by selecting appropriate values for strip width, spacing between strips, and spacing between grids.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
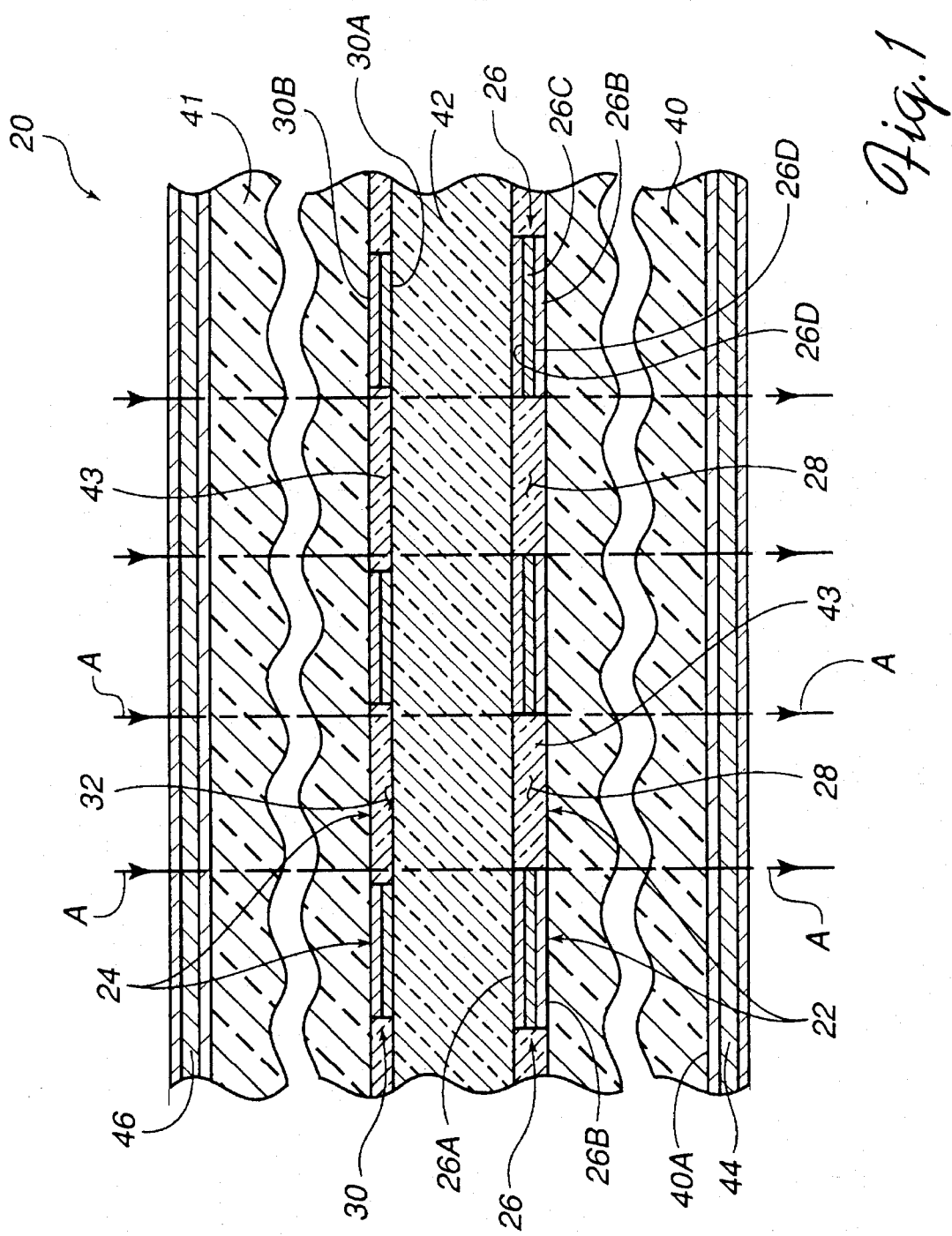
FIG. 1 is a fragmentary general cross-section view schematically illustrating a preferred embodiment of a filter in accordance with the present invention as seen by a user at about normal incidence.
Figure 2:
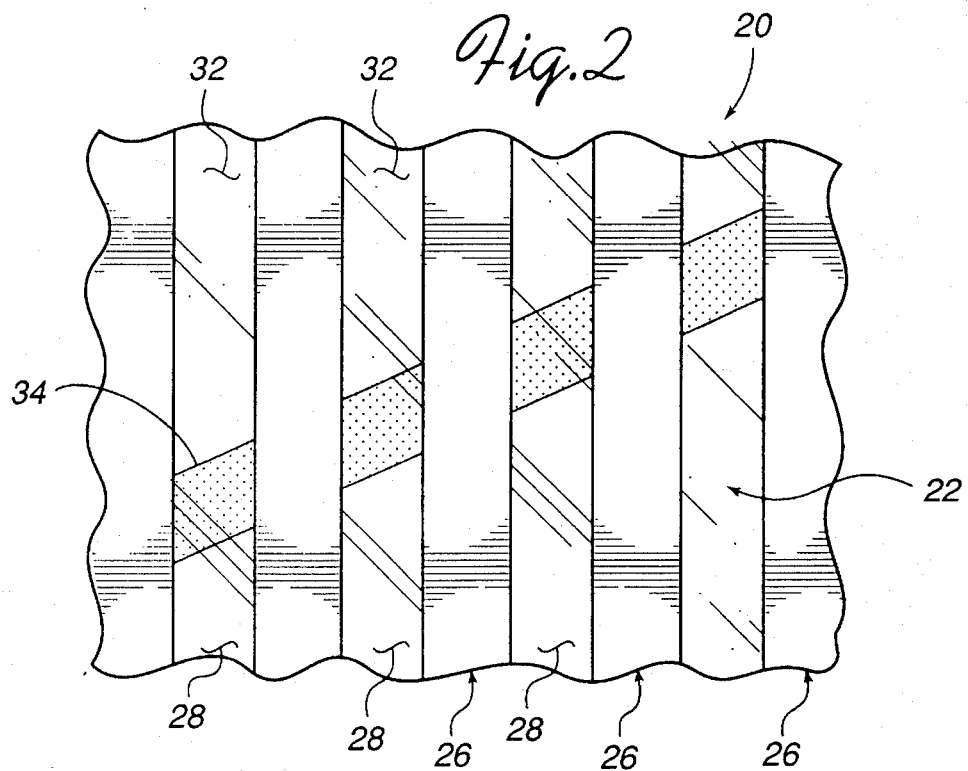
FIG. 2 is a fragmentary front view of the filter of FIG. 1 as seen by a user at about normal incidence.

Turning now to the drawings, wherein like components are designated by like reference numerals, FIGS. 1 and 2 illustrate a fragment of a filter 20 in accordance with the present invention. Filter 20 comprises two generally parallel spaced-apart planar grids 22 and 24. Only grid 22 is visible in FIG. 2. Grid 22 includes a pluralities of parallel, spaced-apart, generally flat, opaque strips 26 having transparent spaces 28 therebetween. Grid 24 includes a plurality of parallel, spaced-apart, generally flat, opaque strips 30 having transparent spaces 32 therebetween.

Each of strips 26 has first and second opposite surfaces 26A and 26B respectively. Each of strips 30 has first and second opposite surfaces 30A and 30B respectively. Surfaces 26A and 26B, and 30A and 30B of strips 26 and 30 lie generally in the plane of the respective grids.

It should be noted here that the term "strip" as used throughout this specification and the appended claims refers to an elongated strip which is significantly wider than it is thick and thus has only two of what can be practically described as surfaces. The width of opposite surfaces 26A and 26B, and 30A and 30B thus defines the width of strips 26 and 30 respectively. Defining surfaces of strips in a grid as being in generally in the plane of the grid assumes that the strips are sufficiently thin that the grid may be conveniently defined as having only one grid plane. As discussed in detail below the strips may be conveniently formed from vacuum deposited layers of metals or dielectrics. As such they will generally have a thickness range between about 0.1 and 5.0 micrometers (μm), most often between about 0.1 μm and 1.0 μm.

It will be evident to those familiar with the art to which the present invention pertains that strips 26 and 30 should not be confused with strips in a louver type of grid. Strips in a louver type of grid are arranged with opposite surfaces thereof at some angle to a general plane of the louver grid, and are spaced apart at a distance such that, at some predetermined angle of incidence, adjacent strips in the grid are self obscuring and light can not pass through the grid.

Neither grid 22 or grid 24 alone will prevent passage of light therethrough at any practical angle of incidence. Grids 22 and 24 must function cooperatively to provide obscuration of a screen image as set forth below.

Grids 22 and 24 are aligned in the same direction, i.e., strips 26 and 30 in grids 22 and 24 are aligned in the same direction. Grids 22 and 24 are also aligned such that surfaces 26A and 30A of strips 26 and 30 respectively are in a face-to-face relationship. Strips 26 and 30 are thus aligned such that when filter 20 is placed in front of a display, and viewed by a user of the display at about normal incidence, as illustrated in FIG. 1, and when grid 22 is closest to the user, grid 24 is not visible to the user, and a displayed image 34 (see FIG. 2) is visible to the user through the spaces 28 and 32 in grids 22 and 24.

The width of strips 26 and 30 and spaces 28 and 30 therebetween are selected such that they are not readily perceived by a user. Preferably the strips and spaces have a width between about 10.0 μm and 200.0 μm and more preferably between about 50.0 μm and 150.0 μm. Subjectively described, the width of the spaces and strips should not be sufficiently narrow to significantly diffract visible light, but not sufficiently wide that they are readily perceived by an unaided eye.

If spaces and strips are formed in accordance with the above described limits, a displayed image, in practice, will not actually appear fragmented as depicted by image 34 in FIG. 2. A pixel of a displayed image on a VDU usually has a dimension of about 300.0 μm and therefore even the widest strip width in the above mentioned width ranges is not wide enough to completely cover one pixel. Because of this, an image seen through filter 20 would appear to be continuous, albeit attenuated compared with an unfiltered image. By way of example, if the spaces and strips are of about equal width, a displayed image viewed through the filter will be attenuated by about fifty percent compared with an unfiltered image.

In descriptions of the filter given below dimensions are given in arbitrary units, relative units, or duty cycle. By way of example, a strip width of 1.0 and a space width of 1.0 may apply to equal space and slit widths of 50.0 μm or 100.0 μm. A relative grid spacing of 2.0 indicates that grids are spaced by a distance equal to the sum of one strip width and one space width. A duty cycle of 1.0 indicates strip and space widths are equal.

Preferably, in grid 22, surfaces 26A and 26B of strips 26 of grid 22 have a low reflectivity for visible light. Preferably the reflectivity of surfaces 26A and 26B should be less than about five percent, and more preferably less than about one percent. In grid 24, surfaces 30A should be highly reflective for visible light. Reflectivity of surfaces 30A is preferably at least fifty percent, and more preferably greater than about eighty percent.

Strips 26 may be formed from an opaque material which has an inherently low reflection such as carbon black. Strips 30 preferably include a highly reflective metal layer, for example, a layer of a metal selected from the group of metals consisting of silver (Ag) magnesium (Mg), aluminum (Al), nickel (Ni), and chromium (Cr), for providing high visible light reflection. When strips 30 include such a metal layer, however, some form of antireflection treatment is required in order to reduce reflection from surfaces 30B of the strips. In practice, both strips 26 and 30 may be formed from a metal layer as a convenient means of making the strips opaque. In the case of strips 26, which must have a low reflectivity, an antireflection treatment is preferably included on both surfaces 26A and 26B of the strips.

Continuing with reference to FIG. 1, strips 26 and 30 may be conveniently formed from vacuum deposited multilayer interference coatings deposited on transparent substrates 40 and 41 respectively. A strip 26 includes a metal layer 26C having on each side thereof an antireflection coating 26D. The antireflection coating includes at least one layer of a transparent dielectric material. The thickness of layer 26C is preferably selected such that it will not transmit visible light, even when visible light reflection from surfaces 26A and 26B thereof is reduced by antireflection coatings 26D.

In one preferred arrangement of a strip 26, layer 26C is a layer of chromium about 100 nanometers (nm) thick. On each side of layer 26C an antireflection coating 26D comprises three layers, two of titanium dioxide (TiO$_2$) and one of chromium as shown in Table 1, wherein layers are numbered in order beginning with the layer furthest from layer 26C.

TABLE 1

| Layer No | Material | Thickness (nm) |
| --- | --- | --- |
| 1 | TiO$_2$ | 47.8 |
| 2 | Cr | 7.7 |
| 3 | TiO$_2$ | 50.5 |

In one preferred arrangement of a strip 30, the strip includes a layer 30C, deposited directly on substrate 41, and an antireflection coating 30D deposited on layer 26C. Layer 30C is preferably a layer of aluminum about 100 nanometers (nm) thick. Coating 26D comprises three layers, two of titanium dioxide (TiO$_2$) and one of chromium as shown in Table 2, wherein layers are numbered in order beginning with the layer furthest from layer 30C.

The coating of Table 1 will provide a photopic reflectivity of about 0.6 percent on surfaces 26A and 26B of strip 26 when it is immersed in a transparent medium having a refractive index of about 1.52 for visible light. The coating of Table 2 will provide a photopic reflectivity of about 1.1 percent on surface 30B of strip 30 when it is immersed in a transparent medium having a refractive index of about 1.52 for visible light. Surface 30A will have a photopic reflectivity of about 88.0 percent.

TABLE 2

| Layer No | Material | Thickness (nm) |
| --- | --- | --- |
| 1 | TiO$_2$ | 48.6 |
| 2 | Cr | 9.7 |
| 3 | TiO$_2$ | 50.3 |

Strips 26 and 30 may be formed by depositing a continuous coating over the surface of substrates 40, and etching the coating to form the spaces and strips. Lithographic techniques for carrying out such a procedure are well known to those familiar with the state of the art to which the present invention pertains and, accordingly, are not described in detail herein.

Continuing now with a more general description of filter 20, having provided grids 22 and 24 on substrates 40 and 41 as described above, assembly of the filter may be completed by laminating grids 22 and 24 to a spacer layer or sheet 42 of a transparent material such as an acrylic. The thickness of sheet 42 is selected to determine the spacing between grids 22 and 24. The sheet preferably has a spacing between about 50.0 μm and 150.0 μm. The lamination is preferably completed by applying an index matching adhesive 43 between spacer layer 42 and grids 22 and 24 such that spaces 28 and 32 are filled with the adhesive, and strips 26 and 30, as well as substrates 40 and 41, are in optical contact with the spacer layer.

Preferably, filter 20, assembled as discussed above, includes an antireflection treatment on at least surface 40A of substrate 40, i.e., on the surface of filter 20 facing a user. An antireflection treatment is also preferred on surface 41A of substrate 41. These antireflection treatments on surfaces 40A and 41A are preferably multilayer interference antireflection coatings 44 and 46 respectively as shown in FIG. 1. Other surface treatments, however, such as etching, may be equally effective.

Coating services for depositing coatings for strips 26 and 30, and for depositing antireflection coatings for surfaces 40A and 41A are available from several commercial suppliers. Glass sheets having a reflection reducing etch on one surface only are available from Tru Vue Inc. of Chicago Ill.

Continuing with reference to FIGS. 1 and 2, when filter 20 is placed in front of a display, and viewed by a user of the display at about normal incidence, as illustrated in FIG. 1, and when grid 22 is closest to the user, grid 24 is not visible to the user, and a displayed image 34 (see FIG. 2) is visible to the user through the spaces 28 and 32 in grids 22 and 24. In FIG. 1 normal incidence rays reaching a user from a displayed image are depicted by arrows A. It may be found useful in practice to arrange a strip 26 in grid 22 to be slightly wider than a corresponding strip 30 in grid 24. This will afford the user a range of incidence angles around normal incidence within which grid 24 will not be visible. This range of angles would be selected to accommodate the angular subtense of a VDU screen with a user's eyes, and thus avoid a vignetting effect at the screens extremities.

Figure 3:
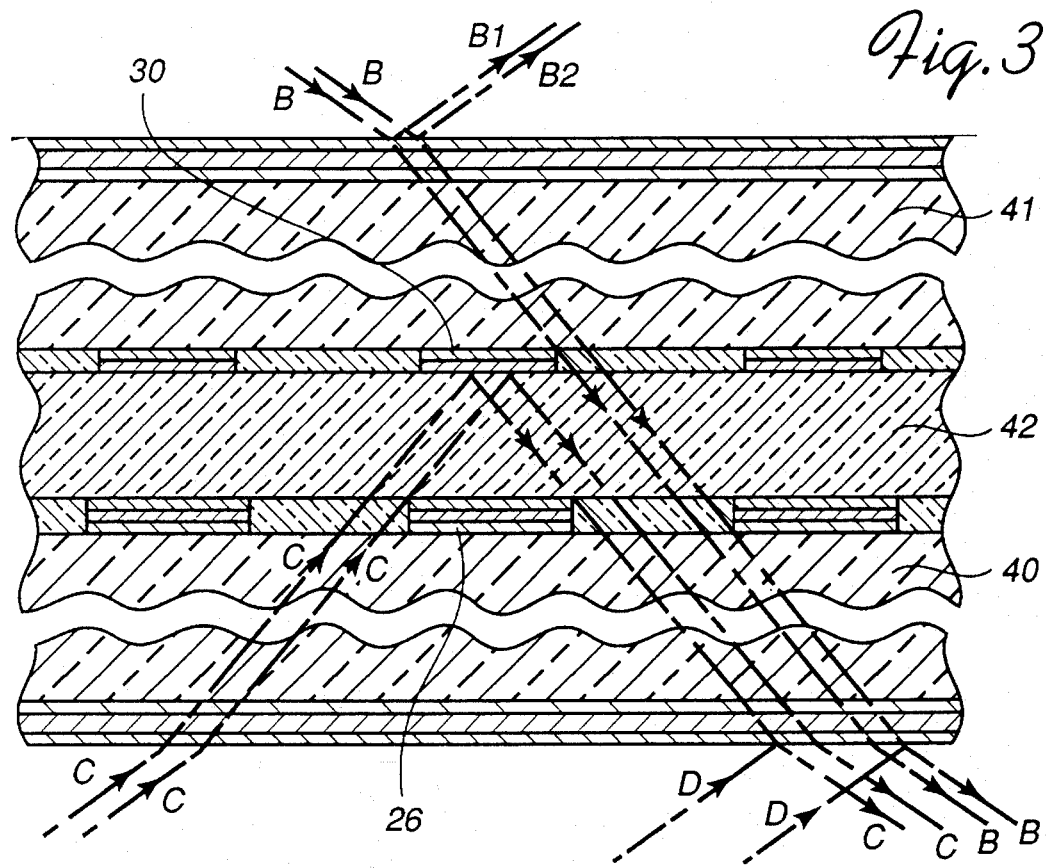
FIG. 3 is a fragmentary general cross-section view schematically illustrating the filter of FIG. 1 as seen by a casual observer at oblique incidence.
Figure 4:
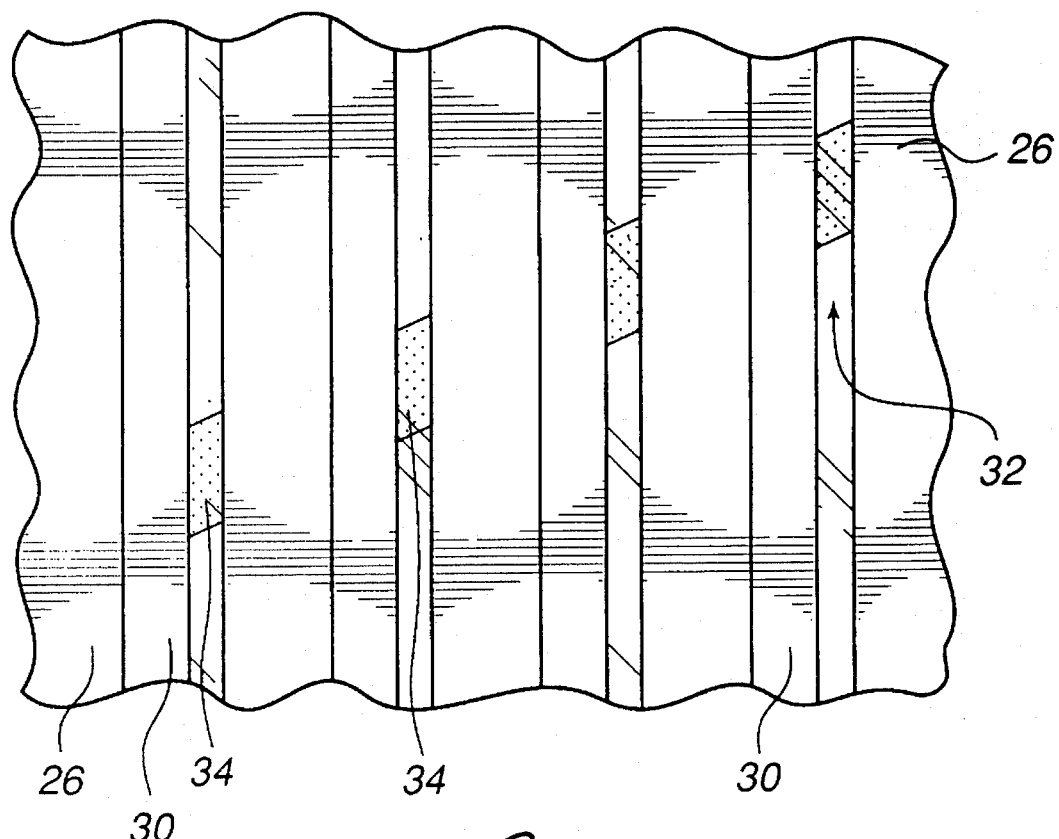
FIG. 4 is a fragmentary front view of the filter of FIG. 1 as seen by a casual observer at oblique incidence.
Figure 5:
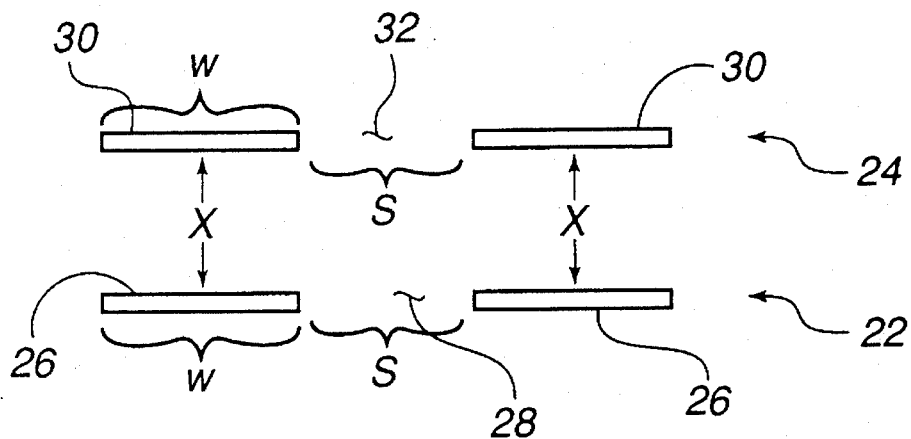
FIG. 5 is a fragmentary general cross-section view schematically illustrating a dimension scheme for a filter in accordance with the present invention.

Optical effects created by filter 20 for an observer observing the filter at angles of incidence significantly greater than normal are illustrated by FIGS. 3 and 4. In FIG. 3, it can be seen that as filter 20 is observed at angles of incidence increasingly greater than normal, strips 30 of grid 24 will become increasing visible to an observer. The increasing visibility of strips 30 causes spaces 32 to appear to be optically closed. As the viewing angle of incidence increases, slits 32 will appear increasingly narrower, increasingly attenuating image 34, as shown in FIG. 4, and by arrows B in FIG. 3. At some angle of incidence, spaces 32 will appear to completely closed and image 34 will be completely obscured. Referring to FIG. 5, strips 26 and 30 are depicted as having an equal width W, spaces 28 and 32 are depicted as having an equal width S, and grids 22 and 24 are spaced by a distance X. Attenuation of the image at normal incidence is determined primarily by the ratio S/(W+S) and the attenuation of the image as a function of incidence angle is determined by W, S, and X. For example, when W, S, and X are equal, complete obscuration of the image would occur when light from the image was required to pass at an angle of forty-five degrees between grids 22 and 24 in order to reach the observer. Because of refraction, this would mean a much greater angle of incidence outside the filter as illustrated in FIG. 4. This condition may be described as a condition wherein grid 22 totally "eclipses" grid 24. At angles greater than this, of course, spaces 32 would appear to reopen and image 34 would appear increasingly visible, absent some other competing optical effect.

In practice there are at least two competing effects. One of these effects is background illumination or room light reflected from grid 24. Referring again to FIG. 3, arrows C depict background illumination reaching the observer by reflecting from strips 30. Note that as long as some light from the image is transmitted, not all of strip 30 is available to direct background light to the observer. As more of strip 30 (grid 24) becomes visible, more background light is reflected and less image light is transmitted. This significantly reduces image contrast to the point where the image is not clearly discernable by the observer, even when some light from the image is actually reaching the observer.

At angles of incidence greater than about forty five degrees, and in particular when surfaces 40A and 41 are antireflection coated, other competing effects occur. First, background light is reflected directly from surface 40A to the observer. This is illustrated by arrows D. Although broad anti-reflection coatings are usually most effective for reducing reflection at normal incidence, they are effective to a lesser extent in reducing reflection at incidence angles up to about forty-five degrees. At angles higher than forty-five degrees, reflection from the coatings rises rapidly and reflection becomes even higher than the would be the reflection from an uncoated surface. This surface reflection phenomena also serves to further attenuate, at both surfaces 40A and 41A, any light from the image which can reach the observer unimpeded by grids 22 and 24. This is illustrated, for example, by arrows B1. Further, as the portion of spaces 32 visible to the observer decreases, diffraction effects will begin to break up whatever is left of light transmitted from the image.

The ratio of light from the image reaching an observer to background light reaching the observer may be defined as a contrast ratio. Those skilled in the art to which the present invention pertains will realize, of course, that this contrast ratio modifies whatever contrast is inherent in a displayed image. It is believed that contrast ratios greater than about 20.0 will not be discernable, one from the other, to an average observer. At a contrast ratio less than about 2.0, however, an image will be effectively obscured by background reflections.

Figure 6:
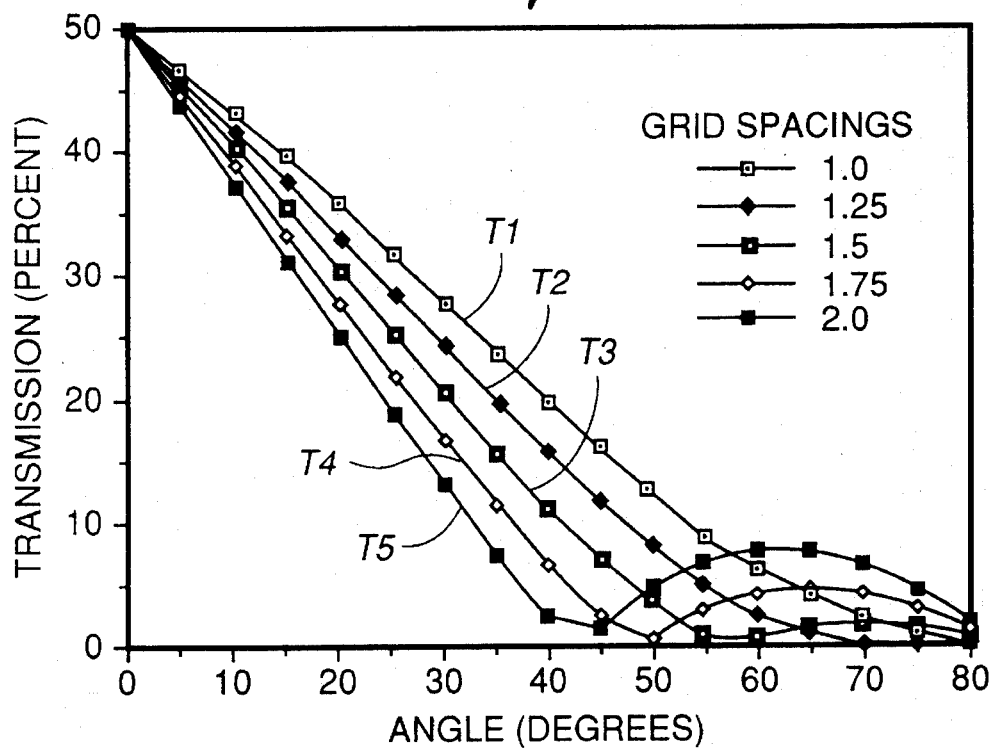
FIG. 6 is a graph schematically illustrating computed transmission as a function of incidence angle for filter arrangements in accordance with the present invention.

Referring now to FIG. 6, computed transmission as a function of angle of incidence (outside filter 20) is shown. It is assumed that spaces in each grid are equal in width, strips in each grid are equal in width, and strips and spaces are equal in width at one arbitrary unit.

Surfaces 40A and 41A are assumed to be coated with a four layer broad band antireflection coating. The coating has a first (outer) layer of silicon dioxide having an optical thickness of about 0.25 wavelengths of visible light, a second layer of titanium oxide having an optical thickness of about 0.55 wavelengths of visible light, a third layer of silicon dioxide and a fourth layer of titanium dioxide, the third and fourth layers together having an optical thickness of about 0.2 wavelengths of visible light. Surfaces 26A, 26B, and 30B are assumed to have negligible reflectivity for visible light. Surfaces 30A of strips 30 are assumed to have a reflectivity of 80 percent. Background illumination is assumed to be half as bright as the displayed image. Substrates 40 and 41, strip 42 and adhesive 43 are all assumed to have a refractive index of 1.52.

Curves T1–T5 show the form of the function for values of X of 1.0, 1.25, 1.50, 1.75, and 2.0 respectively. Note, for spacings of 1.25 or less transmission falls to a minimum value close to zero and stays at that value. At a spacing of 1.0 transmission has not reached zero even at an incidence angle of eighty degrees. This is due to the above mentioned refraction effect.

At higher values of X, transmission falls to a minimum at the total eclipse angle and rises again at higher angles when the eclipse is no longer total. Note, particularly in curve T5, however, that at angles greater than the total eclipse angle (about 45 degrees for curve T5), transmission rises to a maximum value (about ten percent at about 62 degrees incidence for curve T5) and then falls again as incidence angles become even higher. The reduced transmission at these even higher angles results from high reflection losses from coatings on surfaces 40A and 40B.

Figure 8:
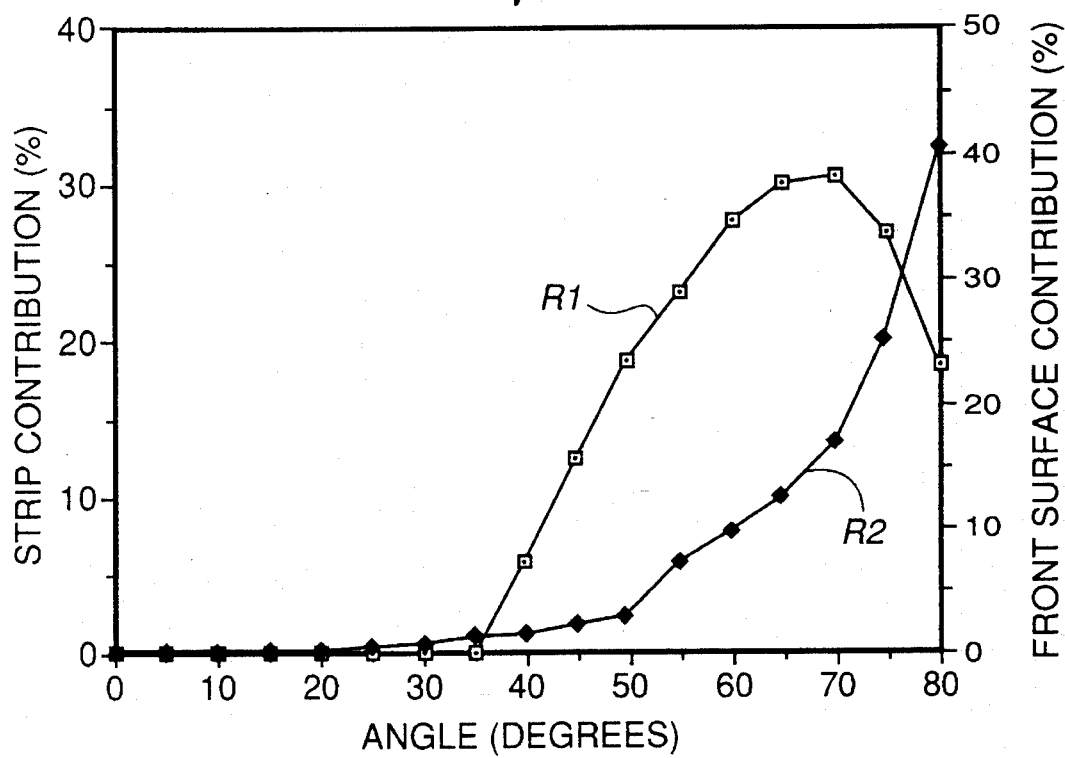
FIG. 8 is a graph schematically illustrating front surface reflection and second grid reflection as a function of incidence angle for a filter arrangement in accordance with the present invention.

The extent of the above described reflection loses can be appreciated from consideration of FIG. 8, wherein computed reflection from surfaces 30A of grid 24 (Curve R1) and from surface 40A of substrate 40 (Curve R2) are shown as a function of incidence angle for one arrangement of a filter in accordance with the present invention. This filter has a grid spacing (X) of 1.2 and all other specifications are identical with the filters of FIG. 6. The fall-off of reflection in curve R1 is caused by a combination of the above-described eclipse effect, and from attenuation of the reflected light due to the front surface reflection R2 continuously increasing. It should be noted that at any stage, an observer sees the sum of curves R1 and R2. By comparing these curves with the curves of FIG. 6 it can be seen that the intensity reflected light is significantly greater than light transmitted from a displayed image, effectively rendering the displayed image undetectable.

Figure 7:
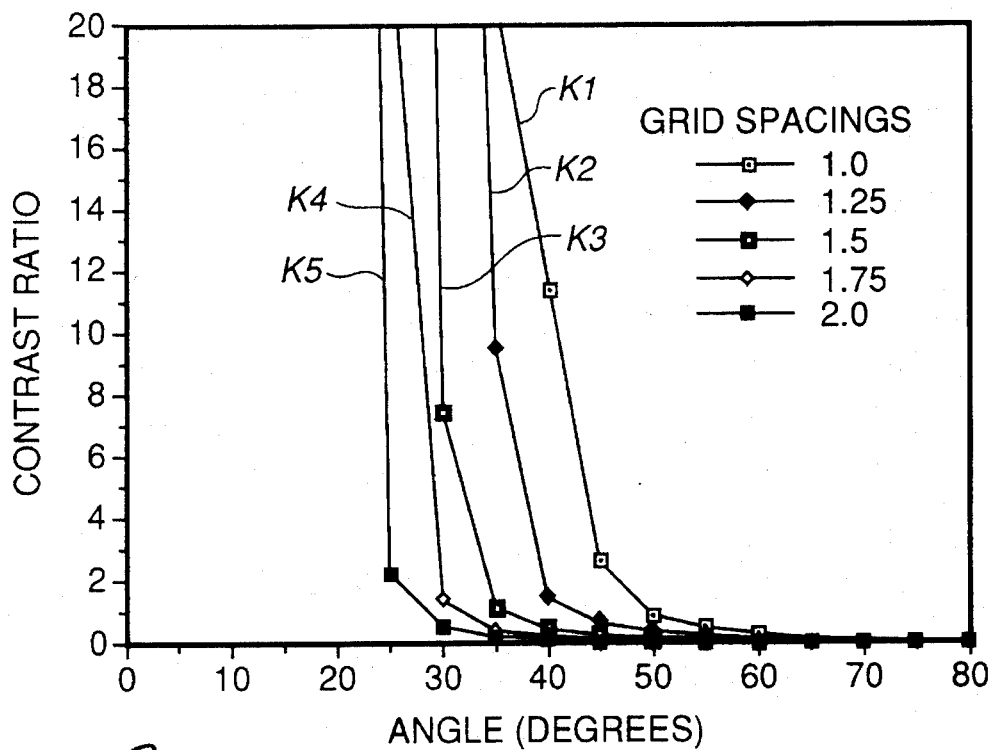
FIG. 7 is a graph schematically illustrating computed contrast ratio as a function of incidence angle for the filter arrangements of FIG. 5.

The effect of these high incidence angle reflections from surfaces 30A and 40A is evident from consideration of FIG. 7 wherein computed contrast ratio as a function of incidence angle is shown (Curves K1–K5) for the filter arrangements of FIG. 6. It can be seen that for a grid spacing of 2.0 (K5) image transmission at 62.0 degrees incidence is overwhelmed by reflections from grid 24 and substrate 40. It can be seen then that the above described filter arrangements permit a relatively wide choice of incidence angle above which the filter effectively obscures an image.

Another potential problem with a filter including a regular grid arrangement of strips or the like is the production of Moiré fringes. Such fringes appear as a result of an optical interaction between the grid and a pixel pattern of a VDU image. A filter in accordance with the present invention may be arranged in a manner set forth below to reduce the probability of occurrence of such fringes.

Figure 9:
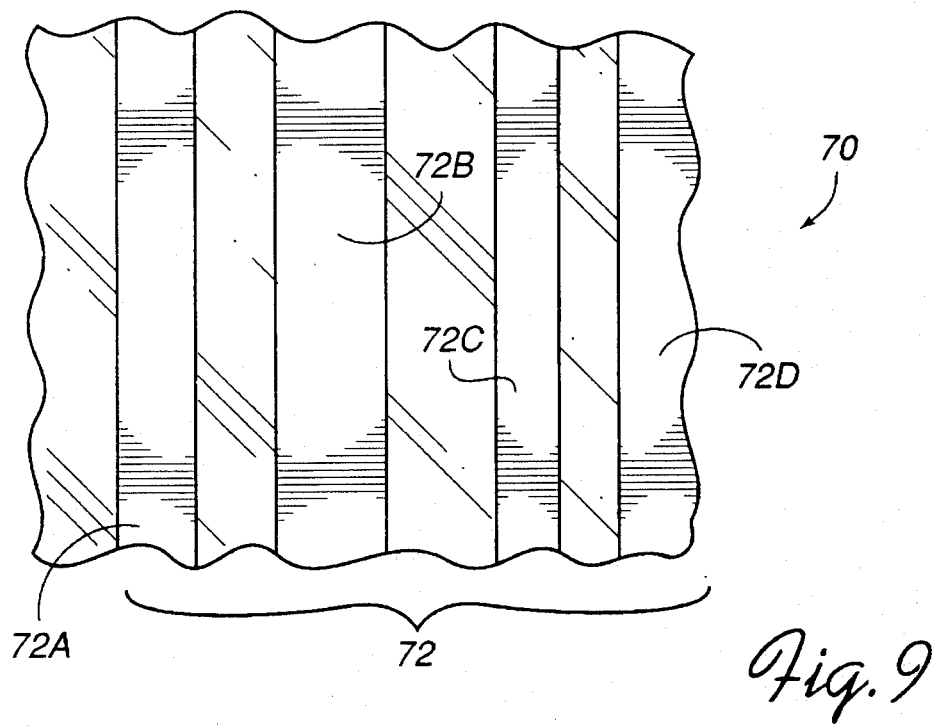
FIG. 9 is a fragmentary view schematically illustrating a strip-grid arrangement for a filter in accordance with the present invention wherein adjacent strips have different widths.

In FIG. 9 is illustrated one form a grid may take in order to reduce the production of Moiré fringes. Here, a grid 70 includes a plurality of strips 72. The strip widths and spaces therebetween are determined by selecting a highest value and a lowest value to define a range of widths, and randomly selecting width values within that range, such that no two adjacent strips in the plurality of strips have exactly the same width. In this way, for example, the width of strip 72A is different from the width of strip 72B; the width of strip 72B is different from the width of strip 72C; and the width of strip 72C is different from the width of strip 72D. There will, of course, also be a very high probability that neither strip 72C nor strip 72D has the same width as strip 72A. Maximum and minimum relative values for widths and spaces could be selected such that the filter did not appear to a user to have non-uniform attenuation properties. This may be achieved, for example, by selecting as maximum and minimum values about 1.2 and 0.8 respectively, with a median value of about 1.0 for the filter as a whole, and, further, by providing that each strip had a corresponding adjacent space of the same width or some selected (constant from strip to strip) multiple or fraction of that width.

Figure 10:
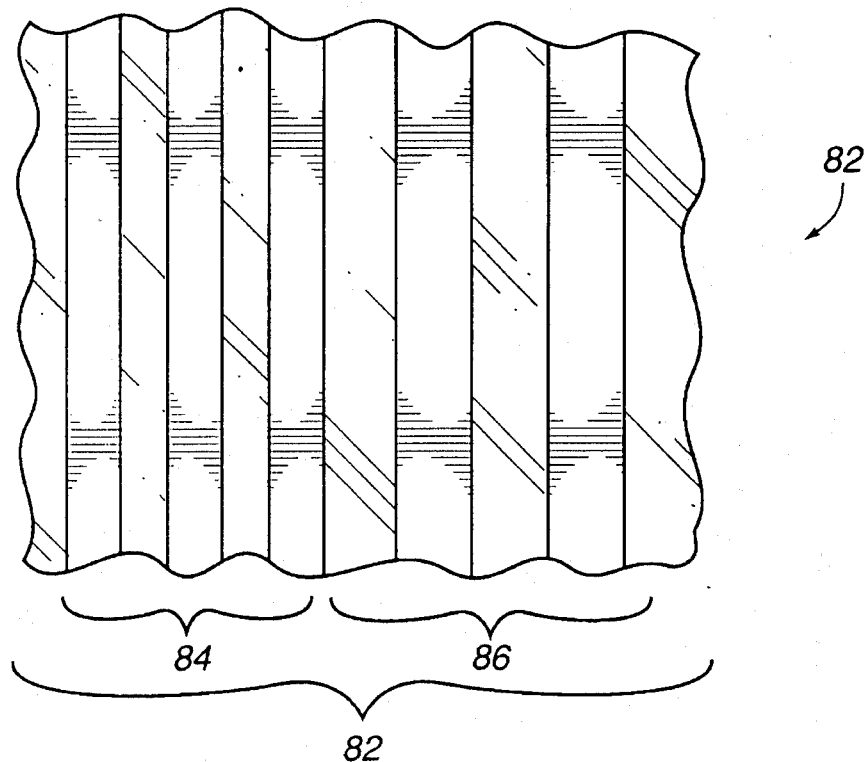
FIG. 10 is a fragmentary view schematically illustrating a strip grid arrangement for a filter in accordance with the present invention comprising adjacent groups of strips, wherein strips in any one group have the same width, and strip widths in adjacent groups are different.

Referring now to FIG. 10, in another arrangement for minimizing formation of Moiré patterns, a grid 80 may be formed from a plurality of strips 82 may be formed from groups of strips, illustrated here by groups 84 and 86. In any one group, all strips have the same width, and all spaces have the same width. In adjacent groups, however, strips have different widths, randomly selected as described above for grid 70. Preferably the ratio of strip width to space width in each group should be kept constant for maintaining uniform transmission over the filter.

As discussed above, the potential problem presented by transmission leakage through a filter at angles of incidence beyond the "total eclipse" angle for two spaced-apart grids was essentially eliminated, for relative grid spacing less than 2.0, by a very high reflection from the filter. Considering FIG. 6, however, it will be evident to those skilled in the art to which the present invention pertains, that, were two grids spaced-apart by significantly more than relative 2.0, transmission leakage at higher angles may not be wholly overwhelmed by reflections.

Figure 11:
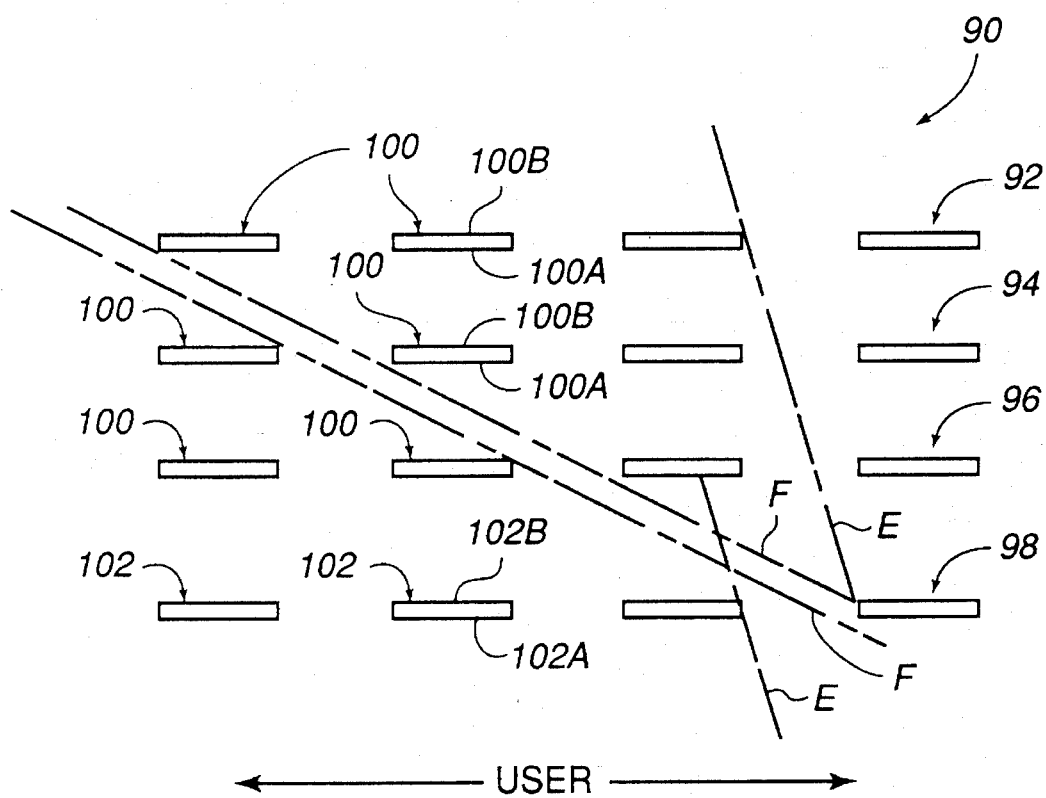
FIG. 11 is a simplified general cross-section view schematically illustrating another embodiment of a filter in accordance with the present invention including four aligned and spaced-apart grids.

This problem can effectively dealt with by using more than two spaced-apart aligned grids as illustrated in FIG. 11. Here, a filter 90 includes four spaced-apart aligned grids 92, 94, 96, and 98. For clarity, no detail of a support structure for the grids is illustrated. By way of example, however, grids 92 and 98 may be supported on transparent substrates, in the manner of grids 22 and 24 of filter 20. Grids 94 and 96 may be supported on either side of a transparent plastic sheet or foil, and grids 92 and 94, and 96 and 98 may be spaced apart by such transparent sheets or foils.

Preferably, grids 92, 94, and 96 includes strips 100 having a similar form to strips 30 of grid 24 of filter 20, i.e., having a highly-reflecting, user-facing surface 100A, and an opposite surface 100B including an antireflection treatment such as an optical interference coating. In grid 98, strips 102 have a similar form to strips 26 of grid 24 of filter 20, i.e., preferably include an antireflection treatment on opposite surfaces 102A and 102B.

The effectiveness of the four-grid arrangement of filter 90 is illustrated by arrows E which show complete transmission cut-off occurring at a relatively small angle. Arrows F indicate a first opportunity for transmission leakage does not occur until an internal incidence angle of over sixty degrees is reached. It will be evident to those skilled in the art to which the present invention pertains that a filter need not be restricted to either two or four grids. A filter may, in theory at least, include two, three, four or more than four grids.

In summary, a filter for privacy filter for a display device has been described. The filter includes two spaced-apart parallel planar grids. In each grid is a plurality of thin flat parallel strips arranged with opposite surfaces, i.e, the width, of the strips in the grid plane. The grids operate cooperatively to allow a user of a display to view the display at a normal angle of use but obscure the display from an observer attempting to view the display at some angle other than the normal angle of use.

Unlike a prior-art louver type planar privacy grid, in which thin flat strips are arranged with the width of the strips at an angle to the grid plane, and which alone will provide obscuration of a display at some predetermined incidence angle, one grid in accordance with the present invention, alone, will not provide obscuration of a display at some predetermined incidence angle. A grid in accordance with the present invention, however, may readily be inexpensively fabricated using large area vacuum deposition technology. Because of this, it is believed that the two or more grids required of the present invention may be produced at less cost, more reproducibly, and in greater sizes than a single prior art louver grid. Such a louver grid is not at all amenable to production by vacuum deposition technology.

The present invention has been described in terms of a preferred and other embodiments. The invention, however, is not limited to the embodiments described and depicted. Rather the invention is limited only by the claims appended hereto.

What is claimed is:

1. A filter for a display unit, comprising:

at least first and second parallel spaced-apart planar grids each thereof having a grid plane;

said first and second grids including respectively first and second pluralities of parallel spaced-apart generally flat opaque strips having transparent spaces therebetween;

each of said strips in each of said grids having first and second opposite surfaces, generally in the plane of the grid;

said first and second pluralities of strips aligned in the same direction, with said first surfaces of said strips in said first plurality of strips in a face-to-face relationship with said first surfaces of strips in said second plurality of strips, such that, when the filter is placed in front of the display with said first grid closest a user of the display and viewed by the user at a first angle of incidence, said second grid is not visible to the user and the display is visible to the user through said spaces in said first and second grids; and said first and second pluralities of strips sized, spaced, and arranged such that when viewed by an observer at a second angle of incidence, said strips in said second grid appear to close said spaces between said strips in said second grid, whereby the display is not visible to the observer.

2. The filter of claim 1 wherein said first surface of each of said strips of said second grid has reflectivity greater than about 50 percent, and said strips of said first and second grids are deposited on first surfaces of respectively first and second transparent substrates.

3. The filter of claim 2 wherein each of said strips in said second grid includes a reflection reducing coating on said second surface thereof and each of said strips in said first grid includes a reflection reducing coating on said first and second surfaces thereof.

4. The filter of claim 3 wherein said first substrate has a reflection reducing treatment on a second surface thereof.

5. The filter of claim 4 wherein said second substrate has a reflection reducing treatment on a second surface thereof.

6. The filter of claim 5 wherein said reflection reducing treatments are multilayer optical interference coatings.

7. The filter of claim 1 wherein said strips and said spaces have a width between about 10 and 200 micrometers, and said first and second grids are spaced-apart by between about 10 and 200 micrometers.

8. The filter of claim 7 wherein said first and second pluralities strips are arranged in parallel groups, said strip widths within each group being equal, and in any adjacent first and second of said groups strips in said first group have a first width and strips in said second group have a second width, said first and second strip widths being different.

9. The filter of claim 7 wherein said strip widths are varied according to a predetermined pattern, said pattern being the same in each of said first and second grids.

10. The filter of claim 1 wherein any of said strips of said first grid has a greater width than a corresponding strip in said second grid.

11. A filter for a display unit, comprising:

at least first and second parallel grids each thereof having a grid plane, said first grid formed on a first surface of a first substrate and said second grid formed on a first surface of a second transparent substrate and each of said first and second substrates having an antireflection treatment on a second surface thereof;

said first and second grids including respectively first and second pluralities of generally flat parallel spaced-apart opaque strips having transparent spaces therebetween, each of said strips arranged parallel a corresponding one of said grid planes;

each of said strips including a metal layer and having first and second opposite surfaces, said second surface adjacent a said substrate, and each of said strips and each of said spaces having a width between about fifty and one-hundred-fifty micrometers;

said first surface of each of said strips in said second grid being highly reflective for visible light, said first surface of each of said strips in said first grid and said second surface of each of said strips in said first and second grids having a low reflectivity for visible light;

said substrates having said first surfaces thereof in a face-to-face relationship and spaced-apart by and in optical contact with a sheet of a transparent material having a width between about fifty and one-hundred-fifty micrometers; and said first and second pluralities of strips aligned in the same direction with corresponding strips in each of said grids in a face-to-face relationship and said strip widths selected such that when the filter is placed in front of the display with the first grid closest a user of the display and viewed by the user at a first angle of incidence, said second grid is not visible to the user and the display is visible to the user through said spaces in said first and second grids; and said first and second pluralities of strips sized, spaced, and arranged such that when viewed by an observer at a second angle of incidence, said strips in said second grid appear to close said spaces between said strips in said second grid, whereby the display is not visible to the observer.

12. The filter of claim 11 wherein on at least one of said second surfaces of said substrates includes a multilayer interference anti-reflection coating.

13. The filter of claim 11 wherein said metal layer includes a metal selected from the group consisting of silver, magnesium, aluminum, nickel and chromium.

14. The filter of claim 13 wherein each of said strips in said first and second grids includes at least one layer of a transparent dielectric material located between said metal layer and said substrate.

* * * * *